No. 735,727. PATENTED AUG. 11, 1903.
W. S. DE WOODY.
NOODLE CUTTER.
APPLICATION FILED NOV. 13, 1902.
NO MODEL.
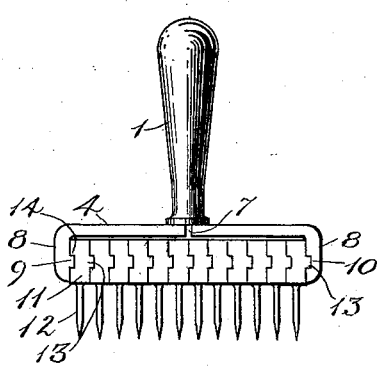
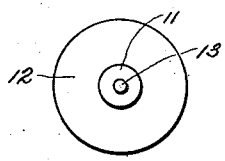
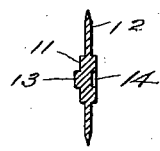
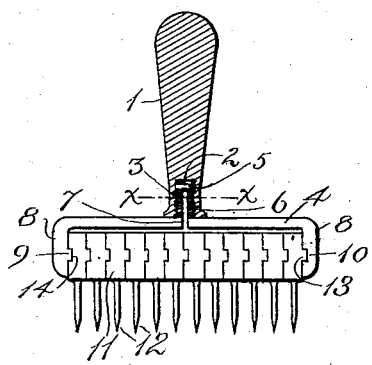
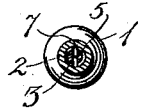
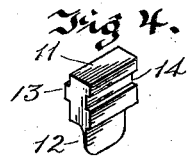
Witnesses.
Inventor
W. S. De Woody
by O D Levis Attorney.

No. 735,727.　　　　　　　　　　　　　　　　　　Patented August 11, 1903.

UNITED STATES PATENT OFFICE.

WILFRED S. DE WOODY, OF FRANKLIN, PENNSYLVANIA.

NOODLE-CUTTER.

SPECIFICATION forming part of Letters Patent No. 735,727, dated August 11, 1903.

Application filed November 13, 1902. Serial No. 131,197. (No model.)

*To all whom it may concern:*

Be it known that I, WILFRED S. DE WOODY, a citizen of the United States, residing at Franklin, in the county of Venango and State of Pennsylvania, have invented a new and useful Improvement in Noodle-Cutters, of which improvement the following is a specification.

My invention relates to noodle-cutters, and has for its object to provide a new and useful form of noodle-cutter in which the knives can be readily removed for sharpening or the like and in which the knives will be firmly held when inserted.

My invention consists of a handle, a knife-holder, and a plurality of knives, all readily adapted to be taken apart or assembled.

Through the drawings like characters of reference refer to like parts.

Figure 1 is an elevation of my device. Fig. 2 is a longitudinal section thereof. Fig. 3 is a cross-section thereof. Fig. 4 is a perspective view of one of the knives. Fig. 5 is a side elevation of a slightly-modified form of the blade. Fig. 6 is a cross-section through the blade shown in Fig. 5.

The handle 1 of my device is provided with a hollow portion 2, having integral threads 3, the purpose of which will be hereinafter set forth. The holder 4 is preferably made in one piece and provided with a tapering outwardly-extending portion 5, having a screw-thread 6 cut thereon. The portion 5 in my preferred form has a slot 7 cut therein, thus forming a split screw. From the body portion of my holder depends arms 8, one of which is provided with a lug 9. In the other arm is formed a recess 10. The knives are provided with a body portion 11, a blade 12, a lug 13, adapted to fit the recess 10, and a recess 14, adapted to be engaged by the lug 9 of the holder. Although I have here shown a lug and a recess extending across the blade and holder in a transverse direction, it is obvious that the same may extend in any other direction and be of any size or shape desired.

The operation of my device will be easily seen from the drawings to consist in bringing the knives together, so that the lug on each fits into the corresponding recess in the adjacent one, and then placing the whole in the holder and screwing on the handle, the screw-threaded portion of which engages the split screw on the holder, forces the ends thereof together, and securely clamps the knives in place.

It will be obvious that other forms of holder may be used—as, for instance, one provided with a thumb-screw at one end thereof in place of the split screw. I do not, therefore, desire to confine myself to the exact form of my device herein shown and described, but wish to include all such as may properly come within the scope of my invention.

I have thus provided a new and improved form of noodle-cutter which can be readily taken apart for any desired purpose and as readily assembled.

In this construction I desire especially to call attention to the fact that my cutting-knives may not be of a fixed form, but may be, as shown in Figs. 5 and 6, of a circular rotary form, and this without changing the principles of my invention in the least.

Having thus described my invention, what I claim as new, and desire to secure by Letters Patent, is—

1. In a noodle-cutter, a handle, a holder attached thereto and a series of interlocking knives held therein.

2. In a noodle-cutter, a handle, a holder and a series of knives, each having a projecting lug on one side thereof and a corresponding recess on the opposite side thereof, said lugs and recesses forming an interlocking mechanism.

3. In a noodle-cutter, a holder provided with downwardly-projecting arms one of which has a recess therein and the other a lug projecting therefrom, and an upwardly-extending split screw, a handle having a hollow, internally-threaded portion adapted to engage the threaded portion of the holder and bring the arms closer together when screwed on said threaded portion of the holder, and a series of knives interlocking with each other and the holder by means of a lug on one side of each knife and a corresponding recess on the other side thereof.

In testimony whereof I have hereunto signed my name in the presence of two subscribing witnesses.

WILFRED S. DE WOODY.

In presence of—
　M. E. HARRISON,
　JOHN C. THOMPSON.